(12) United States Patent
Guerrero et al.

(10) Patent No.: US 7,976,883 B2
(45) Date of Patent: *Jul. 12, 2011

(54) METHOD FOR DELIVERING HOT AND COLD BEVERAGES ON DEMAND IN A VARIETY OF FLAVORINGS AND NUTRITIONAL ADDITIVES

(75) Inventors: Arturo F. Guerrero, Warren, CT (US); David J. Harrison, New Milford, CT (US); Roland A. MacHattie, Marysville, OH (US)

(73) Assignee: Nestec S.A., Vevey (CH)

( * ) Notice: Subject to any disclaimer, the term of this patent is extended or adjusted under 35 U.S.C. 154(b) by 780 days.

This patent is subject to a terminal disclaimer.

(21) Appl. No.: 11/720,251

(22) PCT Filed: Nov. 30, 2005

(86) PCT No.: PCT/EP2005/012753
§ 371 (c)(1),
(2), (4) Date: May 25, 2007

(87) PCT Pub. No.: WO2006/058713
PCT Pub. Date: Jun. 8, 2006

(65) Prior Publication Data
US 2008/0020115 A1    Jan. 24, 2008

(51) Int. Cl.
*A23F 3/00* (2006.01)
(52) U.S. Cl. ........ 426/232; 426/593; 426/594; 426/597; 426/519; 426/520; 222/129.4
(58) Field of Classification Search .......... 426/231–232, 426/590–599, 506–508, 519, 520; 222/129.1–129.4, 222/146.2
See application file for complete search history.

(56) References Cited

U.S. PATENT DOCUMENTS

| | | | |
|---|---|---|---|
| 3,750,908 A | | 8/1973 | Bauerlein et al. |
| 3,881,636 A | * | 5/1975 | D'Aubreby ................ 222/129.4 |
| 4,211,342 A | * | 7/1980 | Jamgochian et al. ...... 222/129.4 |

(Continued)

FOREIGN PATENT DOCUMENTS

CA    2321956    3/2001

(Continued)

OTHER PUBLICATIONS

V. Scott, et al., "Influence of Temperature on the Measurement of Water Activity of Food and Salt Systems," Journal of Food Science (1980), Vo. 48, pp. 552-554.

(Continued)

*Primary Examiner* — Drew E Becker
(74) *Attorney, Agent, or Firm* — K&L Gates LLP

(57) ABSTRACT

The invention relates to a method for delivering a flavored and/or nutritionally enhanced non-carbonated beverage on premise. The method comprises a step of providing at least one packaged source of a liquid premix base comprising at least one microbiologically, physically, enzymatically and/or chemically sensitive beverage component which is not solely carbohydrate, a water activity lowering component. The liquid premix based is formulated with a water activity and/or solid content effective to render it shelf stable at room temperature. The method comprises a step of separately providing a plurality of flowable additive packaged sources adapted to tailor the flavor, aroma, body and/or nutritional value of the beverage. The method comprises a step in which liquid premix base is mixed to hot or cold non-carbonated water to provide a beverage base which is dispensed to the cup and wherein at least one additive is delivered and mixed with the beverage base into the cup.

16 Claims, 3 Drawing Sheets

U.S. PATENT DOCUMENTS

| | | | |
|---|---|---|---|
| 4,748,033 A * | 5/1988 | Syfert et al. | 426/330.3 |
| 4,953,751 A * | 9/1990 | Shannon | 222/14 |
| 4,967,936 A * | 11/1990 | Bingler | 222/129.2 |
| 5,303,846 A * | 4/1994 | Shannon | 222/54 |
| 5,803,320 A * | 9/1998 | Cutting et al. | 222/641 |
| 6,129,943 A * | 10/2000 | Zeller et al. | 426/564 |
| 6,240,829 B1 * | 6/2001 | McGarrah | 99/275 |
| 6,274,187 B1 * | 8/2001 | Lehmberg et al. | 426/435 |
| 6,350,484 B1 * | 2/2002 | Ault | 426/590 |
| 6,423,361 B1 | 7/2002 | Lehmberg et al. | |
| 6,423,362 B1 | 7/2002 | Lehmberg et al. | |
| 6,756,069 B2 * | 6/2004 | Scoville et al. | 426/594 |
| 6,792,847 B2 * | 9/2004 | Tobin et al. | 99/275 |
| 7,147,131 B2 * | 12/2006 | Sher et al. | 222/1 |
| 7,383,966 B2 * | 6/2008 | Ziesel | 222/1 |
| 2002/0148858 A1 | 10/2002 | Bertone | |
| 2004/0056046 A1 | 3/2004 | Jones et al. | |
| 2004/0086620 A1 * | 5/2004 | Tobin et al. | 426/597 |
| 2004/0194629 A1 | 10/2004 | Jones et al. | |

FOREIGN PATENT DOCUMENTS

| | | |
|---|---|---|
| EP | 0162526 | 11/1985 |
| EP | 0893065 | 1/1999 |
| WO | WO0047058 | 8/2000 |
| WO | WO0069274 | 11/2000 |
| WO | WO 02/01993 | 1/2002 |
| WO | W02004026092 | 4/2004 |

OTHER PUBLICATIONS

International Search Report for International Application No. PCT/EP2005/012753 mailed on Feb. 21, 2006.

Written Opinion for International Application No. PCT/EP2005/012753 mailed on Feb. 21, 2006.

* cited by examiner

METHOD FOR DELIVERING HOT AND COLD BEVERAGES ON DEMAND IN A VARIETY OF FLAVORINGS AND NUTRITIONAL ADDITIVES

FIELD OF THE INVENTION

The present intention is directed to a method for delivering flavored or nutritionally enhanced hot and cold beverages like coffee specialties and juice beverages. More particularly, the present invention relates to a method in which a variety of different hot and cold non-carbonated beverages can be produced and delivered at a dispensing location which have different flavored and/or nutritional characteristics.

BACKGROUND OF THE INVENTION

Beverage dispensers are known devices to prepare a beverage from one or more beverage sources. In some types of beverage dispensers, beverage sources that include concentrates and/or powders are mixed with a liquid (e.g., water) to prepare the beverage. Some types of dispensers dispense relatively cold beverages (e.g., soft drinks), while other types of dispensers dispense relatively hot beverages (e.g., coffees, teas, and hot chocolates).

However, there is a high commercial potential for providing on premise to consumers seeking new coffee and beverages experiences, a more varied offering of fresh tasting or coffee-house quality, hot and cold beverages, such as whitened coffee or cocoa beverages, with different flavors such as mocha, vanilla, raspberry, banana, or others and/or different nutritional additives enhancing the nutritional value of these beverages.

In particular, there is an increasing trend of consumption of cold non-carbonated beverages, not based solely on carbohydrates components, that are more refreshing than hot coffee beverages and that can thus be consumed at any time of the day. There is also an increasing health awareness of consumers for non-carbonated beverages and energy or functional drinks as opposed to carbohydrate based carbonated beverages. In particular, operators are under increasing pressure from media, government and consumers to serve healthier alternatives to carbonated soft drinks.

Consumers also expect "coffee-house" quality, range and style in their coffees, and the demand remains very poor except in places where coffee can be brewed on spot. Offering brewed coffees also necessitates complicated logistics to supply to the foodservice location coffee beans, grinders and brewing devices. If the brewed coffees further need to be tailored to meet the consumers' demand in different flavors or nutritional values, the logistics become even more complex and time and labor consuming.

In addition, there is a contradiction in that stores such as quick-serve restaurants, convenience stores, coffee shops, donut stores, leisure places, etc., have limited counter space, while these stores look for multi-function systems to be able to meet the demand of a wider, more eclectic and often multi-cultural population of consumers.

On the operator's side, the operator wants simple and easy solutions due to limited, fast turnaround of staff. The solution also must overcome any concern on food safety and provide a consistent, reproducible beverage cup after cup.

Traditional hot beverage dispensers, such as those disclosed in U.S. Pat. No. 6,419,120 are not adapted to fulfill these needs. These dispensers have multiple flavoring injectors and prepare a flavored beverage by dispensing a base powder, water, and one or more flavorings into a cup. However, when powder and water are mixed to provide a beverage, solids can remain that bind to the flavorings. When flavors are added, they can bind to remaining solids, producing flavor concentrations and unevenness when concentration of solids is high. When producing cold beverages, powder is especially hard to dissolve sufficiently to avoid the presence of a large solid concentration.

These dispensers require a large storage space for the powder with typically tall and large canisters. Other problems are that the characteristics of the powdered components are more susceptible to change due to the environmental conditions (humidity, temperature, . . . ) and are susceptible to transport damages with a change of the particle size due to compaction, which may consequently affect the solubility.

U.S. Publication No. 2004/0086620 relates to a method for delivering flavor compounds to a beverage. A flavor compound is mixed with a concentrate, or a concentrate and water mixture, just prior to the dispensing of the beverage. This method deals with the problem of degradation and instability of the aroma when premixed with a product concentrate. However, it is not adapted to deliver different flavors to a same concentrate in order to provide a wide choice of flavored or nutritionally enhanced beverages. In particular, mixing the flavor with the concentrate causes a problem of taste contamination, which deters other flavors from mixing with the same concentrate.

There is thus a need to develop a method to deliver on premise a variety of flavored or nutritionally enhanced hot and cold beverages like coffee, tea or cocoa specialties and juice beverages from a limited number of product base sources, in a more convenient and hygiene manner, with low labor, no flavor cross-contamination, no dissolution problems, within a compact foot print and without requiring specific chilling storage conditions. In addition, there are also needs for:

improving the consistency of the beverage,
providing a wider choice of components premix,
providing a faster dispense of the beverage,
improving the stability of the stored component(s), and
reducing the negative effect of the environmental storage conditions and eliminating the transportation damages of the product components.

SUMMARY OF THE INVENTION

The invention relates to a method for delivering a flavored and/or nutritionally enhanced non-carbonated beverage on premise. The preferred method comprises a step of providing at least one packaged source of a liquid premix base comprising at least one beverage component that is degradable, such as by virtue of being microbiologically, physically, enzymatically and/or chemically sensitive. This beverage component is not solely carbohydrate. The packaged liquid premix base is formulated to have a water activity effective to render it shelf stable at room temperature by adjusting the total solid content and/or addition of at least one water activity lowering component. The method can comprise a step of separately providing a plurality of flowable additive packaged sources adapted to tailor the flavor, aroma, body and/or nutritional value of the beverage. Liquid premix base is preferably mixed to hot or cold non-carbonated water to provide a beverage base which is dispensed to the cup and wherein at least one additive is delivered and mixed with the beverage base into the cup.

In the preferred method, the premix base has total solid content of at least 65% by weight, a pH of from 3.9 to 6.8, and a water activity less than about 0.855. Preferably, the water activity is less than about 0.85. Most preferably, the water activity is less than about 0.84. In the method, the premix base is diluted with water to form the beverage base at a ratio of concentrate-to-water of about from 1:2 to 1:8 by volume. The flowable additive is preferably mixed in the beverage base in a relative ratio additive to beverage about between 1:1000 to 1:25.

Preferably, the additive comprises a plurality of additives, the beverage base is delivered to the container via a beverage base delivery line, and the method further comprises selecting at least one of the additives and delivering the additives separately from the beverage base to the container without making contact with a beverage the beverage base delivery line. The liquid premix base can comprise a plurality of liquid premix bases, the method comprising selecting at least one of the premix bases and at least one of the additives, and mixing the beverage base having the selected premix bases with the selected additives. At least two of the liquid premix bases preferably can be selected and dispensed in the beverage base.

The preferred liquid base is formulated to mix with water at a temperature of less than 30° C. to provide cold beverages. The preferred liquid is also formulated to be shelf stable for at least 2 months in the unopened package and at room temperature, i.e., between about 18-25° C. The liquid premix base can comprise a first beverage component comprising of coffee concentrate, tea concentrate, cocoa concentrate or chicories concentrate, or combinations thereof; a whitener; and at least one water-activity lowering component that render the liquid premix base shelf-stable. Additionally, the packaged source can comprise a first packaged source of a first liquid premix base that comprises a coffee concentrate, a whitener and a water-activity lowering component; and a second packaged source of a second liquid premix base that comprises a cocoa concentrate, a whitener and at least one water-activity lowering component that renders the liquid base shelf stable at room temperature. The method can further comprise selecting one or both of the first and second liquid premix bases, mixing the selected bases with the water to dispense in to the container. The whitener can be a dairy based component, a non-dairy creamer, or a combination thereof.

The liquid premix base can be a liquid concentrate comprising a beverage component comprising at least 50% by weight pure juice and at least one water-activity lowering component to render the premix liquid base shelf stable. The flowable additive comprises a flavoring, flavor enhancer, nutritional supplement, coffee or tea booster, flavor masker, colorant, aromatic, a substance selected for adding body to beverage base, or combinations of the foregoing. Also, the beverage base can be foamed.

A preferred embodiment of a beverage dispensing system of the invention includes a first liquid source of a first liquid. At least one packaged source of the system contains a liquid premix base comprising at least one degradable beverage component that comprises at least a non-carbohydrate subcomponent. The packaged liquid premix can be formulated to have a water activity effective to render the premix shelf stable at room temperature. A blending system can be operably associated with the first liquid and packaged source for receiving and blending the first liquid and liquid premix base to provide a beverage base. A premix base dispensing mechanism is preferably configured for delivering the liquid premix base to the blending system. A first liquid dispensing mechanism configured for delivering the first liquid to the blending system is preferably provided, such as a pump; along with a plurality of additive packaged sources comprising flavor, aroma, body and/or nutritional additives; an additive dispensing mechanism operably associated with the additive sources for selectively dispensing the additives therefrom to mix with the premix base and the first liquid to provide a flavored, aromatic, and/or nutritionally enhanced beverage; and a controller associated with the dispensing mechanisms for selectively controlling the actuation of the dispensing mechanisms.

The controller is preferably associated with the dispensing mechanisms to vary the relative concentration of the dispensed additives in the dispensed beverage base. A beverage base dispensing conduit is preferably provided and configured for dispensing the beverage base into a container. The additive dispensing mechanism is configured for dispensing additives into the container separately from the beverage base to prevent contacting the additives with the beverage base delivery conduit. Also, the controller is preferably configured for operating the additive dispensing mechanism to dispense the additives in pulses of predetermined durations.

The system can have a heater configured for heating the beverage base to provide hot beverage. A cooling system can additionally or alternatively be provided for cooling the beverage base to below ambient temperature.

The invention thus provides an improved method of dispensing a beverage that can be easily tailored by the user and which has components that are easily stored and selected.

DETAILED DESCRIPTION OF PREFERRED EMBODIMENTS

Figure 1:
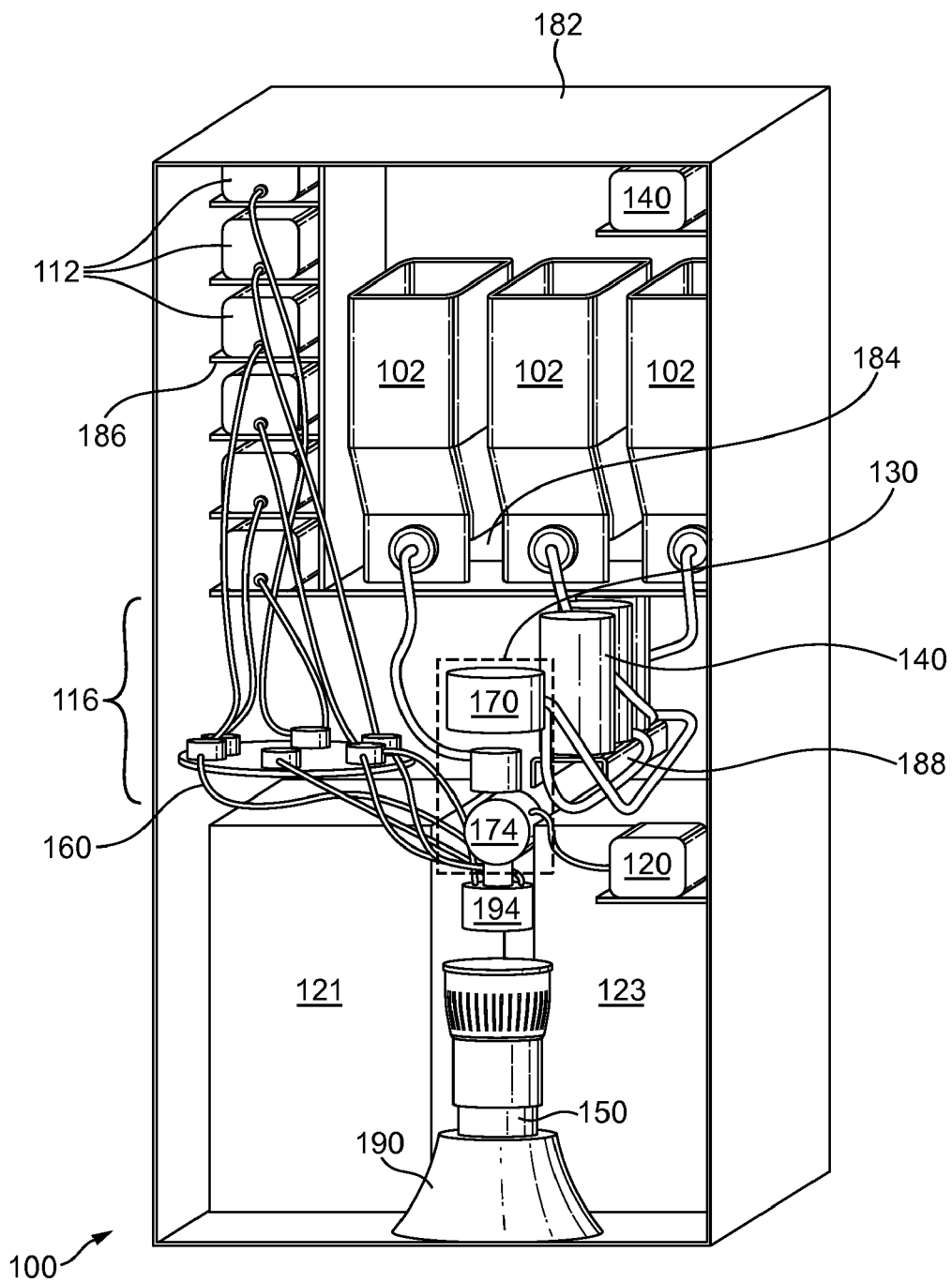
FIG. 1 is a front perspective view of an embodiment of a beverage dispenser.

The present invention is directed to a method for delivering a flavored and/or nutritionally enhanced non-carbonated beverage on premise. In the preferred embodiment comprising:

at least one packaged source of a liquid premix base is provided comprising at least one microbiologically, physically, enzymatically and/or chemically sensitive beverage component that is not solely carbohydrate and that is in an aqueous medium, wherein the packaged liquid premix base is formulated to have a water activity effective to render it shelf stable at room temperature (i.e., of from about 18 to 25° C.) by adjusting the total solid content and/or addition of at least one water activity lowering component, a plurality of flowable additive packaged sources are separately provided, which are adapted to tailor the flavor, aroma, body and/or nutritional value of the beverage, the liquid premix base is dosed, transported and mixed with water, ranging from hot to cold, to provide a beverage base in the cup, and at least one additive is dosed, delivered into the cup and mixed with the beverage base into the cup.

Preferably, the at least one additive is separately shot in the container when the beverage base is delivered.

The shelf stability of the premix base refers to the ability of the premix base to remain microbiologically, enzymatically, chemically and physically stable over a certain period of storage under unopened conditions of the package. The premix base should not experience any microbial growth, or substantially no microbial growth, phase separation or taste degradation or other sorts of chemical or enzymatic degradation during a period of at least about 2 months, more preferably at least about 6 months, and most preferably at least about 12 months. Viscosity limits are defined in the product specification and should remain within these limits after the selected period, for example of 2 months after this period. Physical stability, including phase separation, colour, etc., are preferably still within all specified standards for the product. Spoilage can be tested after this period as well, as known in the art.

In a preferred embodiment, the number of additives is greater than 1 and any one of said flowable additives can be selected and separately delivered from the beverage base to the cup without making contact with the beverage base delivery line. Therefore, a wide choice of flavored or nutritionally enhanced beverage can be produced sequentially without raising a cross-contamination issue, therefore, minimizing cleaning and/or rinsing in-between.

Furthermore, the number of liquid premix bases available and selectable is preferably greater than 1 and wherein each liquid premix base can be mixed with any one of the additives. Therefore, this provides the possibility of offering differently flavored or nutritionally enhanced beverages obtained from different bases and different additives.

In a further embodiment, each liquid premix base can further be dispensed and mixed with at least one other liquid premix base. This also provides the possibility to offer an even wider range of beverages.

In an embodiment, the number of liquid additives is greater than 2. The number of additives would typically be between 3 and 20.

In one aspect of the invention, the liquid base has the ability to mix with water at a temperature of less than 30° C., so that a cold flavored and/or nutritionally enhanced beverages can be delivered upon request while imparting a homogeneous taste to the beverage.

One approach of the invention also lies in having at least two essential base components in the packaged liquid premix base including:
  at least one microbiologically, physically, enzymatically and/or chemically sensitive beverage component that is made at least from a subcomponent that is not a carbohydrate and which may optionally include carbohydrates, thus such component is not solely carbohydrates, and
  at least one water-activity lowering component that lowers water activity to impart shelf stability to the liquid premix base.

The water-activity lowering component in the context of the invention can be any component that results in a lowering of the water activity by increasing the amount of total solids in the formulation of the liquid premix base and/or by adding a recognized food-grade component acting as such as a water-activity reducer.

Therefore a ready-to-dilute food liquid is provided that can serve as a beverage base for a wide range of beverages tailored only at the time of serving based on the choice of the consumer. The liquid offers the advantages of quality consistency, convenience, cleanliness, and better controls stability for these mixes during storage as compared to powder typically stored at ambient air.

In one embodiment of the invention, the premix liquid base comprises:
  a first beverage component chosen among the group of coffee or tea concentrate, cocoa concentrate or chicories concentrate and combinations thereof,
  a second beverage component, which is or includes a whitener, and
  at least one water-activity lowering component that contributes to imparting an improved shelf stability.

It is advantageous to group the coffee or tea concentrate and the whitener in the same liquid base. Usually, the whiteners are kept separate from coffee or tea, and whitening is performed only when preparing the beverage on demand. However, it has been found that by having the whitener and coffee or tea together, the system's complexity and footprint are considerably reduced provided that the liquid base is set at the correct water-activity level to ensure a sufficient stability to ensure full freshness of the whitened base. The customization of the beverage can then be just handled by the additives to provide the choice to the customer. Another advantage is that whiteners can be added that are usually not stable in powder form. These unstable whiteners, usually non-dairy in nature, are similar to those typically used to whiten coffee.

More preferably, the method comprises:
providing a first packaged liquid premix base, comprising a coffee or tea concentrate, a whitener and at least one water activity lowering component;
providing a second packaged liquid premix base, comprising a cocoa concentrate, a whitener and at least one water-activity lowering component;
wherein the first and second packaged liquid premix bases can be separately and/or simultaneously mixed with water and separately and/or simultaneously dispensed in the cup.

In another mode of the invention, the premix liquid base is a liquid concentrate comprising:
  a beverage component comprising at least 50% by weight pure juice,
  at least one water-activity lowering component that improves or provides shelf stability to the premix liquid base, and
  water.

The liquid base can be kept at least shelf stable for preferably at least 2 months and more preferably 6 months, in the unopened packaged form. The shelf stability can further be obtained both by the formulation of the premix liquid base itself, i.e., a sufficiently low water activity, and by heat treatment of the base prior to packaging it in an airtight package. In an alternative, heat treatment can be applied after the base has been filled in the package and the package has been sealed.

Therefore, the premix liquid base preferably comprises:
  total solids of at least 65%, preferably between 68% and 75% by weight,
  a pH of from around 3.9 to 6.8, preferably 6.1 to 6.7,
  a water activity of less than 0.855, preferably less than 0.85, and most preferably comprised between 0.84 and 0.80.

The water activity is principally set by controlling the solids in the liquid base depending upon the type and concentration of the microbiologically, physically and/or chemically sensitive beverage component(s) and whitener.

Suitable water activity lowering component for controlling the total solids can be carbohydrates and/or salts. Carbohydrates are preferably used in amount to set the correct total solids in the premix base, while balancing the sweet taste of the premix base. Carbohydrates are used in an amount of from about 30% to 60% by weight solids, preferably of from about 35% to 55% by weight solids, in the premixed base.

A carbohydrate such as sucrose is preferred for the reduction of water activity. Other possibilities include monosaccharides and polysaccharides known in the art to be GRAS ("Generally Recognized As Safe").

Preferably, water-activity reducers, such as sugars, can be used in combination with compounds such as glycerin and salt.

Other components of the liquid premix, such as buffer salts serve to protect the product from the effects of pH changes and other destabilizing factors.

The liquid premix can be treated in different ways depending on the components to ensure microbiological stability during preferably at least 6 months in unopened state. Heat treatment includes: High Temperature Short Time thermal processing (HTST) or Ultra High Temperature thermal processing (UHT). HTST uses heating the base at about 87-90° C. for about 30 seconds. UHT uses heating the base under controlled pressure at about 120° C. for a 3-5 seconds. Preferably, the liquid base is then hot-filled in a pouch or other containers in clean or aseptic conditions. Due to the low water-activity of the preferred embodiment, HTST is also preferred. The package may be filled aseptically, with the packaging sterilized before filling and with the filling conducted in a sterile environment. The package may alternatively be clean-filled, with the packaging obtained in a clean state and the filling conducted under ambient conditions, which is possible due to the low water-activity.

The whitener can include a dairy based concentrate or non-dairy creamer. Dairy based concentrate can be whole milk concentrate, skimmed milk concentrate or a concentrate containing some part of milk or dairy based cream.

Typical non-dairy creamers are components that give the visual and taste perception of milk in the beverage. Preferred non-dairy creamers comprise vegetable oils, carbohydrates, sodium caseinate or other proteins, and buffers. Non-dairy creamer may be preferred in some instances because it avoids some of the food sensitivity/allergen issues associated with milk proteins and carbohydrates (e.g., milk protein allergies and lactose intolerance).

In one embodiment, a first non-carbohydrate component of the liquid premix base is a coffee concentrate with a total solids comprised between around 68% and 75% and a pH set between around 6.0 and 6.4. In another mode, a first component is a cocoa concentrate with total solids comprised between around 68% and 75% and pH set between about 6.5 to 6.7.

In another embodiment, a beverage component of the liquid base comprises at least 50% by weight of natural juice in the liquid base and added water, when reconstituted as a ready-to-drink beverage. The product is microbiologically stable due to a combination of low pH, preferably lower than around 4.6, and thermal processing, e.g., pasteurization, hot-fill and hold or UHT.

Natural juices used preferably include white grape, apple, or pear juices or a combination of.

Furthermore, stabilizers can be used for improving the physical and chemical stability of the liquid premix base. Stabilizers bind water, making less water available to support chemical reactions or biological growth. Stabilizers also decrease the mass transfer within the product matrix, thus reducing interaction of components and accessibility for chemical and biochemical reactions. For suspension of components, an ingredient recognized as GRAS may be used. Examples of stabilizers include gum Arabic, carrageenans, maltodextrins, and gelatin. To prevent or reduce coffee solid precipitation, or aggregation of proteins in the premix liquid base, a GRAS compound or stabilizer may also be used. Examples include sodium phosphate (mono and dibasic), as well as sodium hexametaphosphate.

During the mixing step of the method, in the beverage dispenser, a metered amount of the premix base is diluted with water to form the beverage base at a ratio of concentrate-to-water preferably from around 1:1 to 1:9, more preferably of around from 1:2 to 1:8.

The flowable additive is mixed in the beverage base preferably in relative ratio of additive to beverage between 1:1000 to 1:25, more preferably between 1:500 and 1:50. The actual concentration of additive in the beverage base will depend on the types of additives, the beverage base and other factors known to those skilled in the art.

The flowable additives can be flavorings, flavor enhancers, nutritional supplements (e.g., vitamins, minerals, and can include substances recognized in the art as improving mental or physical well-being), coffee or tea boosters, flavor maskers, colorants, aromatics, substances for adding body to beverage bases (e.g., substances capable of forming foam), and/or combinations of the foregoing.

Flavorings include any one of non-coffee, non-cocoa flavors. Preferably, such flavorings include almond nut, amaretto, anisette, brandy, cappuccino, mint, cinnamon, cinnamon almond, mint crème, moca, grand marnier, peppermint, pistachio, sambucca, apple, chamomile, cinnamon spice, crème, vanilla, French vanilla, Irish cream, kahlua, lemon, macadamia, nut, orange, orange leaf, peach, lemon, banana, strawberry, grape, raspberry, cherry, and the like, aroma enhancers such as herbs, spices, as well as mixtures of these foregoing flavorings.

The flavorings are diluted in a carrier, such as an organic solvent. A preferred solvent is propylene glycol because it is a food grade solvent with the correct range of viscosity enabling accurate dosage of low volumes of the additive (e.g., doses of less than 1 mL per pulse) and is accepted as safe on a worldwide basis and by different cultures.

In preferred embodiments, the liquid premix base comprises about 5 to 10% coffee, cocoa or tea solids, 15 to 30% non-dairy creamer, 30-50% sweetener, 0-5% flavor(s) and 0-2% nutritional additive(s); wherein the base has a water activity of less than 0.85 and a pH is about 6 to 7 and total solids is about 67-75% by weight.

The premix liquid base has preferably a viscosity of less than about 5,000 cPs at an operating temperature of around 25° C., and is maintained within a range of about +/−200 cPs. The constraint of a viscosity enables the premix liquid base to be dosed through conventional pumps, such as peristaltic pumps or piston pumps or diaphragm pumps, and dispensed quickly through the dispensing system. The low viscosity deviation can ensure reproducible reconstitution of the product. Higher ranges of viscosity could be envisaged, and pumping devices specifically designed to handling high viscosities may be used where desired or necessary, but this would increase the cost of the dispenser and could decrease the acoustic comfort level for the operator In one embodiment of the invention, mixing of the liquid premix base with the diluent, such as hot or cold water, is carried out before the beverage base is dispensed in the container. Mixing can take place by the liquid base and diluent being directed into a mixing bowl; with the diluent reaching a sufficient velocity to create turbulence. The liquid premix base and diluent may also be mixed at the intersection of two conduits, for example. The method of the invention may also include a step for foaming the beverage base with water to deliver a foamed flavored and/or nutritionally enhanced beverage. The foaming step may be conducted with a mechanical or venturi device that provides sufficient shear on the mixture of the base and water to foam it to a preselected level. A mechanical device for mixing and/or foaming can include an impeller or whipper located in the path of the beverage base flow path and rotating at high speed. The speed can be varied by a controller depending on the type of beverage and the amount of foam desired.

In another embodiment, the mixing of the diluent and liquid premix base takes place in the serving container itself. For this, the diluent is provided as at least one jet of diluent within an elevated velocity, during and/or after the liquid premix base has been dispensed in the container. High velocity diluent jets enable to create turbulence to mix the beverage base and the additive and eventually also provide foam on the beverage. Thus, the beverage base can be foamed according to the method and system described in U.S. co-pending patent application Ser. No. 10/930,663 entitled, "Method and System for In-Cup Dispensing, Mixing and Foaming Hot and Cold Beverages from Liquid Concentrates", filed on 30 Aug. 2004; the content of which is hereby incorporated herein by reference thereto.

In another embodiment, the mixing and foaming steps occur by mixing the concentrate with at least one jet of water that enters in collision with the stream of concentrate above the container. The additive can be delivered separately in the container while the mixing and foaming take place. The beverage base can be mixed with the additive(s) and foamed according to the method and system described in U.S. co-pending patent application Ser. No. 10/727,532, entitled: "Method and System for Dispensing Hot and Cold Beverages from Liquid Concentrates", filed on 5 Dec. 2003; the content of which is hereby incorporated herein by reference thereto.

In an embodiment, a cold beverage with ice can be delivered. For this, ice is added to the flavored or nutritionally enhanced beverage during dispensing. Ice can be manually added in the cup before filling this cup with the beverage base and flavors. An automatic ice dispenser can also be associated to the dispensing system to serve ice in the container.

The preferred method of the invention maintains a proper hygiene level, preferably to maintain industry standards as known in the art, of the dispensing system by applying a cleaning step which is performed at periodical intervals. The cleaning step cleans all the parts of the system that have been in contact with the beverage base, i.e., the mixture of the liquid premix and water.

Preferably, the cleaning step includes flushing hot water at a temperature effective to stop any possible microbial spoilage on the fluid contact surfaces of the system. An effective temperature range varies from about from 80 to 99° C., more preferably around 85-95° C., depending on the nature of the liquid premix dispensed. The cleaning cycle can be controlled to be run between each beverage cycle and/or at timed intervals (e.g., every 4 and 24 hours).

Another method for preventing microbial growth is to have dedicated nozzles for hot and cold water and to keep the cold water and product line at low temperature, i.e., lower than about 10° C., more preferably, lower than about 5° C.

A preferred embodiment of a dispenser for delivering the flavored and/or nutritionally enhanced non-carbonated beverage on premise comprises:

a first liquid source;

at least one packaged source containing a liquid premix base comprising at least one microbiologically, physically, enzymatically and/or chemically sensitive beverage component which is not solely carbohydrate, wherein the packaged liquid premix is formulated to have a water activity effective to render it shelf stable at room temperature;

a blending system operably associated with the first liquid and packaged source of liquid premix base for receiving and blending a first liquid and a liquid premix base from the sources to prepare a beverage base;

a premix base mechanism configured for delivering the liquid premix base to the blending mechanism;

a first liquid mechanism configured for delivering the first liquid to the blending mechanism; the first liquid and premix base blending together at a controlled ratio in the blending mechanism to provide the liquid beverage base; and a controller associated with the dispensing mechanisms for selectively controlling the actuation of the dispensing mechanisms.

One preferred dispensing system for carrying out the method of the invention will now be more fully described in relation to the figures. One or more examples of the illustrative embodiments are shown in the drawings. Those of ordinary skill in the art will understand that the disclosed dispensers and dispensing methods can be adapted and modified to provide dispensers and dispensing methods for other applications, and that other additions and modifications can be made to the disclosed beverage dispensers and dispensing methods without departing from the scope of the present disclosure. For example, features of the illustrative embodiments can be combined, separated, interchanged, and/or rearranged to generate other embodiments. Such modifications and variations are intended to be included within the scope of the present disclosure.

As shown in FIG. 1, the dispenser 100 of a preferred embodiment includes base storage chambers 102 that store premix bases and that are in fluid communication with a base-liquid dispensing mechanism 106. Additive containers 112 store additives and are in fluid communication with an additive dispensing mechanism 116. A blending mechanism 130 is provided in fluid communication with the dispensing mechanisms 106 and 116 and with a liquid source 120. Dispenser 100 also includes a controller 145 that is operatively connected to the dispensing mechanisms 106 and 116, the liquid source 120, and the blending mechanism 130.

Dispenser 100 can also include a variety of structural features whose functions are well known to those of ordinary skill in the art. For example, dispenser 100 can include a housing 182; shelves 184, 186, 188 that are attached to the housing 182 and that support storage chambers 102, containers 112, and other components; a container 150 for receiving the dispensed flavored beverage; and a drip pan or drain 190 for collecting overflow or spillage from the container 150.

Dispenser 100 is preferably configured to prepare a variety of beverages, including relatively hot and relatively cold beverages. Some embodiments are configured for dispensing relatively hot or relatively cold beverages, but not both.

As further described below, during operation of dispenser 100, controller 145 preferably causes base-liquid dispensing mechanism 106 and additive dispensing mechanism 116 to dispense a beverage base (which is prepared from the premix bases stored in chambers 102) and one or more additives into container 150. Generally, during such operation, controller 145 controls the dispensing of the beverage base and the additives so as to vary the concentration of the dispensed additives in the dispensed beverage base as the beverage base is being dispensed.

In the embodiment shown in FIG. 1, base-liquid dispensing mechanism 106 includes component delivery mechanisms, such as pumps 140, that are fluidly connected by conduits (e.g., tubing and plugs) to the storage chambers 102 for delivering premix bases from those chambers to the blending mechanism 130. The storage chambers 102 can store a variety of premix bases as aforementioned. Preferably, the base component is not a powder. Thus, the mechanisms to handle the concentrates, such as the component delivery mechanism, include mechanisms that are configured for handling fluid concentrates instead of powders. Pumps can be used instead of augers, for instance. Preferably, base-liquid dispensing mechanism 106 includes a separate pump 140 for each different storage chamber 102 to prevent or inhibit cross-contamination between different premix bases stored in the storage chambers 102.

In the embodiment shown in FIG. 1, the additive dispensing mechanism 116 includes pumps 160 that are connected to the containers 112 for delivering additives from those containers to the blending mechanism 130. The containers 112 can store a variety of additives, such as, but not limited to, concentrates, liquids, emulsions, and syrups. For example, the containers 112 can store flavorings (e.g., vanilla extract), nutritional supplements (e.g., vitamin and/or minerals, whey or bran, or substances recognized to improve mental and body well being), coffee or tea boosts, sweeteners, whiteners, flavor enhancers, flavor reducers, colorants, aromatics, substances for adding body to base liquids (e.g., substances capable of forming foams), and/or combinations of the foregoing. Preferably, additive dispensing mechanism 116 includes a separate pump 160 for each different container 112 to prevent or inhibit cross-contamination between different additives stored in the containers 112.

A variety of pumps that are well known to those of ordinary skill in the art, such as peristaltic pumps, piston pumps and diaphragm pumps, can be used in base-liquid dispensing mechanism 106 and in additive dispensing mechanism 116 to deliver the premix bases from storage chambers 102 and the additives from containers 116 to the blending mechanism 130. Preferably, pumps 140 and 160 are capable of providing liquid streams, such as liquid jets.

The base-liquid dispensing mechanism 106 of the preferred embodiment is also associated with the liquid source 120, which provides a liquid that can be blended in blending mechanism 130 with one or more beverage components and/or one or more beverages to provide a base liquid. Usually, liquid source 120 is a source of potable water at ambient temperature and is connected to a valve and/or a pump of the base-dispensing mechanism 106 that is controlled by the controller 145. As shown in FIG. 1, liquid source 120 can be in fluid communication with a heating unit 121 (e.g., a boiler) and/or a cooling unit 123 (e.g., a refrigeration unit) that are operatively connected to controller 145 and that are controlled thereby to provide relatively hot or relatively cold water to blending mechanism 130. In one embodiment, however, the liquid source includes a dedicated source of hot water, a dedicated source of cold water, or both (such as dedicated sources external to dispenser 100), and which can be full of heating and/or cooling units. In some embodiments, the liquid source 120 is a source of liquid other than water at ambient temperature such as, but not limited to, carbonated water, cream, juice, or milk.

Figure 2:
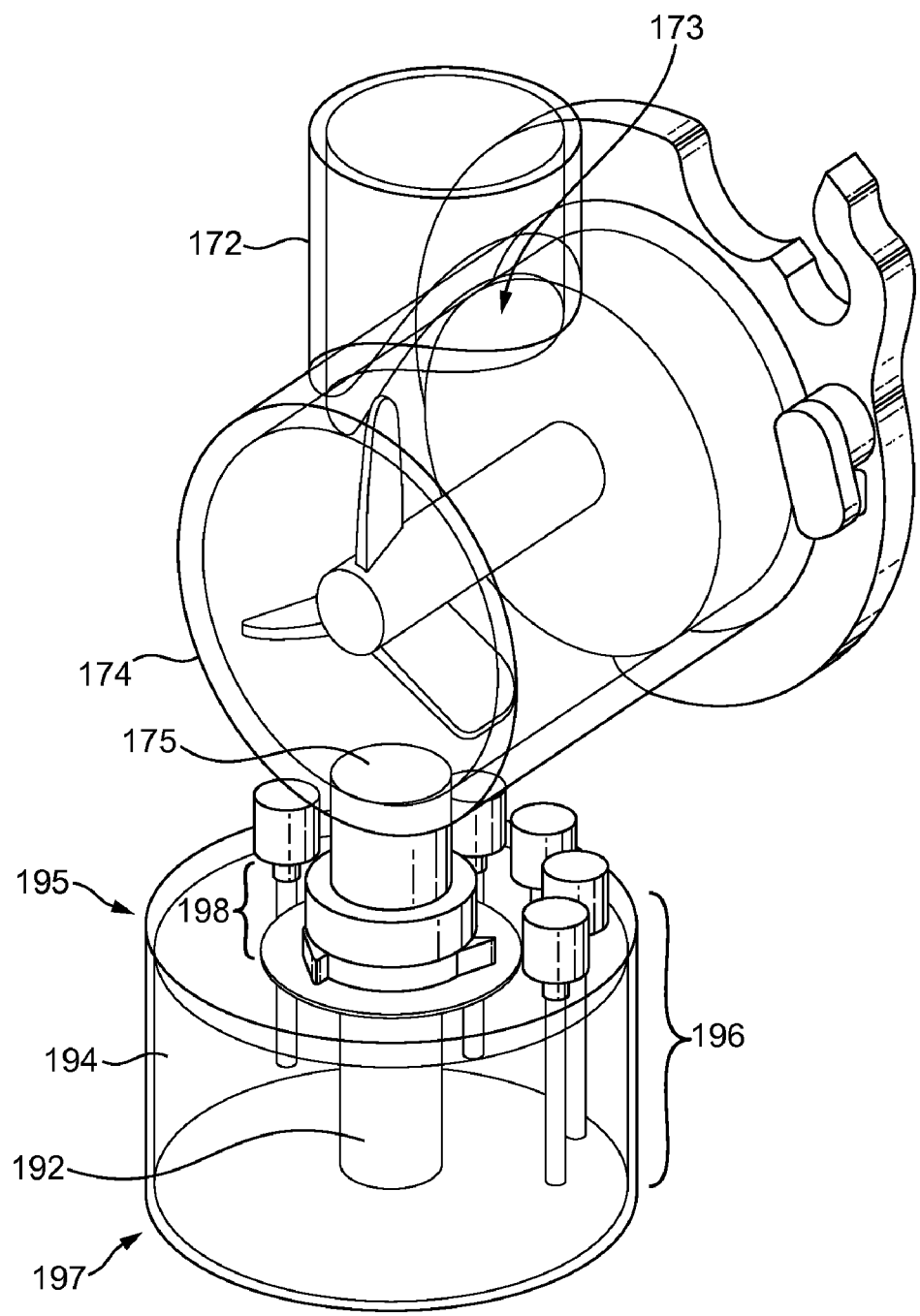
FIG. 2 is a perspective view of the blending mechanism in the embodiment of the beverage dispenser of FIG. 1.

Referring to FIGS. 1 and 2, blending mechanism 130 includes a mixing cup 170 that is preferably configured as a funnel and is fluidly connected via a conduit 172 to a whipping chamber 174 that has an inlet port 173 and an outlet port 175. The mixing cup 170 is in fluid communication with pumps 140 and liquid source 120 for receiving the premix bases and liquid therefrom. The whipping chamber 174 preferably includes a whipper 176 that is operatively connected to controller 145 and that includes a whipper element, such as vanes or fins 177, for whipping the beverage base that passes from mixing cup 170 and into chamber 174 via conduit 172 and inlet port 173. A variety of whippers that are well known to those of ordinary skill in the art (e.g., disk-type and vane-type whippers) can be used as whipper 176 to whip the beverage base.

The blending mechanism 130 includes a base-liquid dispensing nozzle 192 in communication with the outlet port 175 of whipping chamber 174, a delivery guard 194 surrounding the dispensing nozzle 192, and one or more additive nozzles 196. The base dispensing nozzle 192 directs the beverage base that passes through the outlet 175 of the whipping chamber 174 into the container 150. The delivery guard 194, which can be attached to dispensing nozzle 192 via, among other things, a gasket and clamp assembly 198, prevents or inhibits the liquid being dispensed from dispenser 100 from splashing and/or projecting substantially outwards beyond the delivery region, i.e., the open end of the container 150. The additive nozzles 196 are in fluid communication with the pumping devices 160 and are disposed along the longitudinal axis of the dispensing nozzle 192 for dispensing additives into container 150. Within the delivery guard 194, nozzle 192 is separated from additive nozzles 196, and additive nozzles 196 are separated from each other to prevent or inhibit splashing and cross-contamination between the beverage base and the additives and among the additives during operation of dispenser 100.

In the shown embodiment, the delivery guard 194 includes a hollow cylindrically-shaped piece of plastic, metal, or other suitable material that has a closed end 195, an open end 197, and one or more apertures that are formed in the closed end 195 and spaced along an arc. The apertures are sized, shaped, and arranged such that, when additive nozzles 196 are disposed therein, the nozzles 196 are supported and are positioned to direct additives into container 150. Alternatively, the delivery guard 194 includes a solid cylindrically-shaped (or otherwise shaped) piece of material having one or more channels that are formed therethrough and that are sized, shaped, and arranged for conducting additives from pumps 160 to container 150.

As shown in FIG. 1, controller 145 is operatively connected to base-liquid dispensing mechanism 106 (e.g., pumps 140), additive dispensing mechanism 116 (e.g., pumps 160), liquid source 120 (and, in some embodiments, heating and cooling units 121 and 123), and blending mechanism 130 (e.g., whipper 176). Controller 145 is a processor-controlled device that is capable controlling and the timing of the dispensation of the premix bases, the additives, and the liquid. A variety of processor-controlled devices well known to those of ordinary skill in the art can be used as controller 145 to control the operations of dispenser 100 and its component mechanisms. Some of these devices include, but are not limited to, a programmable logic controller (PLC), a programmable timing device, a personal computer, a computer workstation, a laptop computer, a server computer, a mainframe computer, a handheld device (e.g., a personal digital assistant, a Pocket Personal Computer (PC), a cellular telephone, etc.), an information appliance, etc. As further described herein, in some embodiments, controller 145 is operatively connected to a user interface, e.g., a mouse, a keyboard, a touch sensitive screen, a track ball, a keypad, etc., so as to receive commands and/or other information from a user of the dispenser 100.

As previously described, during operation of dispenser 100, controller 145 controls the dispensing of beverage base and additive(s) so as to vary the concentration of the dispensed additive(s) in the dispensed beverage base during the dispensing of the beverage base. Preferably, controller 145 controls the dispensing so that dispenser (i) dispenses the beverage base and the additive(s) in jet streams of fluid, (ii)

begins dispensing the additive(s) later than the dispensing of the beverage base, and (iii) finishes dispensing the additive(s) not later than finishing the dispensing of the beverage base. Dispensing the additive(s) in such a manner facilitates blending between the additive(s) and the beverage base by capitalizing upon the agitation that is naturally produced in the prepared beverage by the impact of the jet-type fluid streams being dispensed. In addition to facilitating blending, stopping the dispensing of the additive(s) not later than when the dispensation of the beverage base has stopped reduces waste by inhibiting splashing of the additive(s) from the surface of the prepared beverage.

Although jet-type streams or sprays are preferable for the additive, non-jet streams can also be used. Preferably, however, the streams are produced by forcing the stream out of a nozzle at elevated pressure to facilitate mixing. Typical flow rates are around 0.25 fluid ounces per second (i.e., about 7.1 grams per sec.) to about 10 fluid ounces per second (i.e., 283.5 grams per sec.), more typically between about 0.5 and 3 fluid ounces per second (i.e., 14.18 and 85.1 grams per sec.) with a preferred flow rate on the order of about 1 fluid ounce per second (28.35 grams per sec.).

Generally, controller 145 communicates with one or more storage media that include instructions for causing controller 145 to prepare a flavored beverage. These instructions can include instructions for controlling pumps 140 and 160, heating and cooling units 121 and 123, and other components (such as the components shown in FIGS. 1-3) so as to generate and/or dispense a beverage base and/or one or more additives into container 150.

Usually, controller 145 receives a selection of a desired flavored beverage from a human operator or user of dispenser 100 via a user interface. For example, controller 145 can receive a selection by detecting a mouse click, a keyboard entry, a keypad entry, and/or another input event initiated by the user. In some embodiments, based on receiving that selection, controller 145 prepares the selected favorable beverage automatically. For example, in some of such embodiments, controller 145 dispenses the beverage base and the one or more additives according to the instructions in the storage media (e.g., instructions related to the timing and flow rates of the dispensing). Alternatively, in some embodiments, controller 145 prepares the beverage based on the instructions that are included in the storage media and the instructions that are received from a user during dispensation. For example, in some of such embodiments, controller 145 determines the timing at which one or more additives are dispensed into container 150 based on user inputs.

Figure 3:
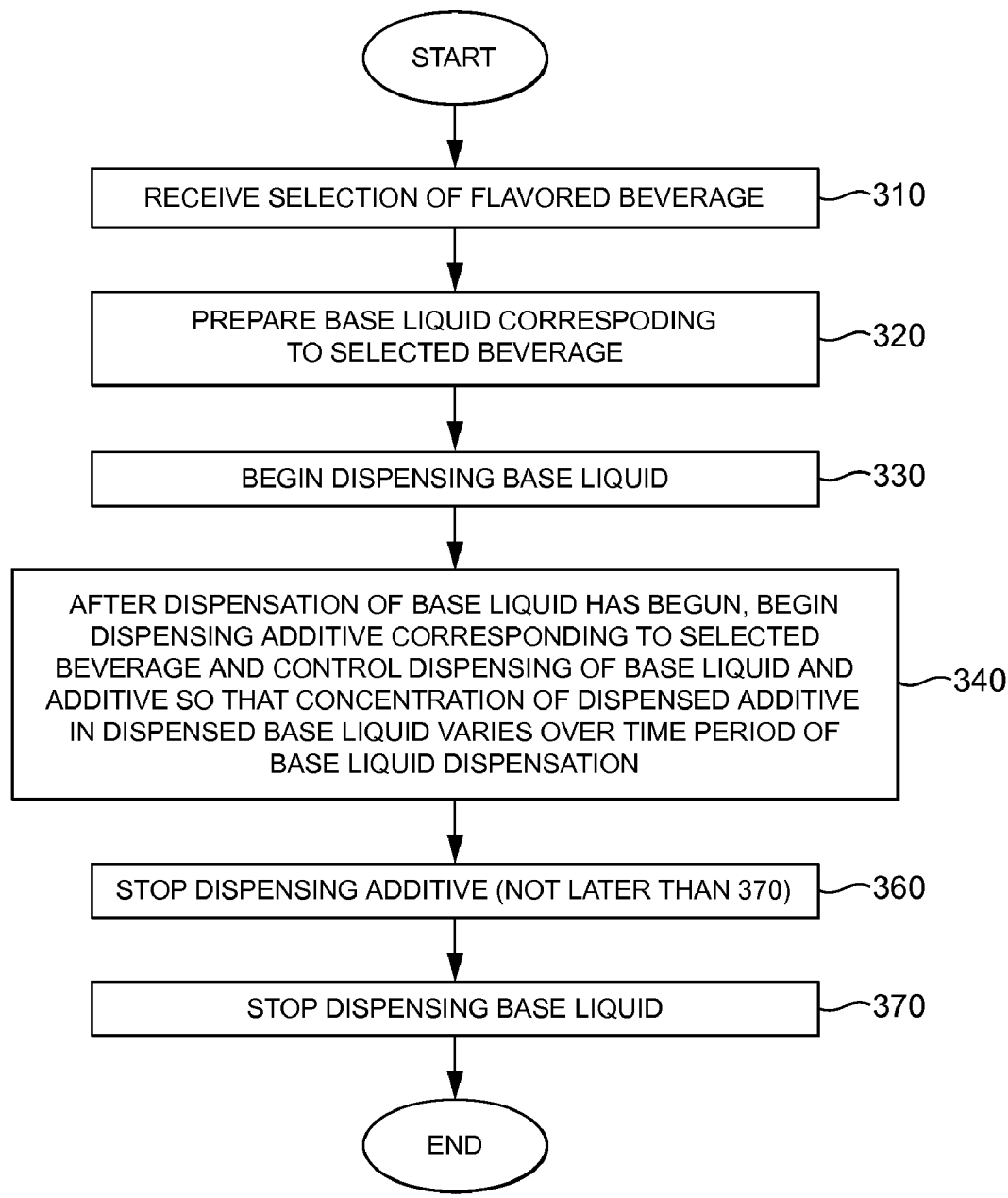
FIG. 3 schematically illustrates an embodiment of a method for preparing a beverage with the dispenser of FIGS. 1 and 2.

FIG. 3 schematically illustrates an embodiment of a method for preparing a flavored beverage with the dispensers shown and described with respect to FIGS. 1 and 2. As will be understood by those of ordinary skill in the art, the disclosed dispensing methods are not limited to the exemplary method shown in FIG. 3, can prepare beverages with dispensers different than those shown in FIGS. 1 and 2, and can prepare beverages based on features that are different than and/or additional to those shown in FIG. 3.

As shown in FIG. 3, a selection of a flavored beverage is received via, e.g., a user interface (310 in FIG. 3). Based on receiving the selection, controller 145 causes a beverage base corresponding to the selection to be prepared (320 in FIG. 3) and dispensed into container 150 (330 in FIG. 3).

In most embodiments, the beverage base is prepared by mixing one or more of the premix bases stored in storage chambers 102 with a liquid from liquid source 120. Preferably, at least one of the premix bases includes a flowable liquid concentrate. (In some embodiments, of course, the beverage base can include the liquid from liquid source 120 itself or, alternatively, one or more liquid premix bases which do not need to be mixed with the liquid from liquid source 120.) Usually, therefore, controller 145 prepares the beverage base by activating pumps 140 and/or other components so as to direct pre-determined amounts of the one or more premix bases and the liquid of liquid source 120 to blending mechanism 130 (e.g., mixing cup 170). In some embodiments, controller 145 prepares the beverage base at substantially an ambient temperature. Alternatively, in some embodiments, controller 145 prepares the beverage base by heating or cooling the liquid from liquid source 120 (i.e., by causing the liquid to pass through heating or cooling unit 121 or 123) prior to directing the liquid to blending mechanism 130. Cooling of the liquid from liquid source 120 can produce a relatively cold beverage base. Beverage bases can be dispensed at less than about 50° C. for some beverages, and at less than about 40° C., 30° C., 25° C., or 20° C. for different types of beverages, or even below about 10° C. for cold beverages. Some beverage can be dispensed at room temperature, and others can be dispensed at heated temperatures, such as above 40° C. and more preferably above about 50° C.

After dispensation of the beverage base into container 150 has begun, controller 145 causes the additive or additives corresponding to the user's selected flavored beverage to be dispensed into container 150 by activating pumps 160 and controls the dispensing of the additive and the beverage base (i.e., controls pumps 140 and/or 160 and/or other components of dispenser 100) so that the concentration of the dispensed additive in the dispensed beverage base varies over the time period of the beverage base dispensation (340 in FIG. 3).

As previously described, the additive dispensation preferably begins after the starting time of the beverage base dispensation so as to facilitate mixing between the additive and the beverage base. While the additive dispensation can begin about from 0.5 seconds to 10 seconds after the starting time of the beverage base dispensation, the additive dispensation preferably begins at least 1 second after the starting time of the beverage base dispensation so as to enhance mixing. In most embodiments, the additive dispensation will begin about from 1 second to 3 seconds after the starting time of the beverage base dispensation.

The concentration of the dispensed additive in the dispensed beverage base preferably is between about 1:1000 to about 1:25 volume of base additive to beverage base. Preferably, this concentration is from about 0.1 mL additive per 250 mL beverage base to as much as about 2 mL additive per 250 mL beverage base for coffee products, and from about 1 mL and 10 mL of additive per 250 mL beverage base in nutritional supplements. The actual concentration of additive in beverage base will depend on the types of additive and beverage base and beverage to be prepared and other factors known to those of ordinary skill in the art.

In some embodiments, controller 145 causes the additive to be dispensed continuously into container 150, i.e., dispensed in a continuous stream throughout the duration of additive dispensing. Controller 145 can be configured to continuously dispense the additive based on instructions that are stored in the storage media and/or instructions that are received from an user via a user interface (e.g., based on the "push and hold" operation previously described herein).

Alternatively, in some embodiments, controller 145 causes the additive to be dispensed intermittently or "pulsed" into container 150. Controller 145 can be configured to pulse the additive based on instructions that are stored in the storage media, e.g., instructions indicating a number of pulses, the durations of each pulse, the durations between each pulse, the start time of pulsing relative to start time of beverage base dispensation, and the end time of pulsing relative to start time and/or end time of beverage base dispensation. In some "pulsed" embodiments, the dispensation of the beverage base can be paused during pulsing, i.e., can terminate prior to additive pulsing, and recommence after additive pulsing. Preferably, though, the beverage base is dispensed throughout additive pulsing so as to enhance mixing between the beverage base and the additive. Alternatively, controller 145 can cause the additive to be pulsed based on instructions that are received from a user via a user interface (e.g., based on the "push" operation previously described herein). In such embodiments, the features of the pulsing (e.g., number of pulses, durations, durations between, start times, and stop times) can be determined by the user inputs, such as the particular beverage and additive selected.

Eventually, controller 145 causes the dispensation of the additive to terminate (360 in FIG. 3) and the dispensation of the beverage base to terminate (370 in FIG. 3). Generally, the controller controls the dispensation periods so that the beverage base is dispensed for a time period $T_1$ and the additive is dispensed for a time period $T_2$, in which time period $T_2$ commences after the start of time period $T_1$ and terminates not later than the termination of time period $T_1$. Preferably, the additive dispensing terminates before the termination of the beverage base dispensing (i.e., the time period $T_2$ terminates before the termination of time period $T_1$) so as to enhance mixing between the additive and the beverage base and prevent or inhibit splashing of the additive from the surface of the dispensed beverage. To that end, in most embodiments, the additive dispensation will terminate within about 2 seconds of the termination of the beverage base dispensation. In some embodiments, the beverage base dispensation can be terminated at a time period (the "stopping time period") after the termination of the additive dispensing. The duration of that time period can be proportional to the additive dispensation time period $T_2$.

In some embodiments, controller 145 controls dispensation of the beverage base so that, during at least a portion of the period of that dispensation (preferably, during a terminal portion of that period), the beverage base is whipped by whipper 176 prior to being dispensed into container 150. For example, in some of such embodiments, controller 145 can cause the beverage base to be whipped by whipper 176 towards the end of the dispensation period of the beverage base so as to provide a layer of foam on the liquid beverage in container 150 (e.g., a layer of foam for a coffee beverage, such as a cappuccino or a latte). The whipping period can be based on instructions in the storage media and/or can be determined based on instructions received from an operator via a user interface.

As previously described, controller 145 can cause one or more additives to be dispensed into container 150 (340 in FIG. 3). In embodiments in which more than one additives are dispensed, controller 145 and/or a user via a user interface can control the dispensation features of each additive, e.g., the start time of dispensation, the end time of dispensation, etc. In one such embodiment, the start times and the end times at which two or more additives are dispensed overlap, so that the additives are dispensed simultaneously, thereby enhancing blending among the additives. In another embodiment, the start times and/or the end times can be different, so as to prevent or inhibit cross-contamination that could occur during simultaneous dispensation.

While the disclosed beverage dispensers and dispensing methods have been shown and described with reference to the illustrated embodiments, those of ordinary skill in the art will recognize and/or be able to ascertain many equivalents to those embodiments by using routine experimentation. Such equivalents are encompassed by the scope of the present disclosure and the appended claims. The entire contents of co-pending U.S. application Ser. No. 10/999121, filed on 30 Nov. 2004herewith and entitled, "Beverage Dispenser with Variable-Concentration Additive Dispensing", is hereby incorporated herein by reference thereto.

For example, while the disclosed beverage dispensers have been described with respect to premix bases that are stored in "storage chambers" and "additives" that are stored in "containers," the disclosed beverage dispensers are not limited to such storage media and can be suitably modified so as to store the premix bases and/or the additives in other types of storage media, such as, but not limited to, bags, cartons, cylinders, cartridges, hoppers, and the like. As such, references herein to storage chambers and containers are for convenience only, and are to be understood more generally as references to storage media for storing premix bases and additives.

Also for example, the disclosed beverage dispensers are not limited to storing the premix bases and/or the additives inside housing 182, but can be suitably modified to store one or more premix bases and/or one or more additives outside housing 182 and attached thereto and/or outside housing 182 and not attached thereto (e.g., at locations remote from the housing). Moreover, the disclosed beverage dispensers can be suitably modified to store the beverage components at locations inside the housing 182 that are different than those shown and described herein. Also for example, the disclosed beverage dispensers are not limited to the types and/or the arrangements of components shown in FIGS. 1 and 2 and can be suitably modified so as to provide the mixing features described herein with different types and/or different arrangements of components. Unless otherwise provided, when the articles "a" or "an" are used herein to modify a noun, they can be understood to include one or more than one of the modified noun.

EXAMPLES

In the following examples, all percentages are expressed in weight.

One coffee-based liquid premix is made of the following:

| | |
|---|---|
| Coffee solids | 5-10% |
| Non-dairy creamer* | 15-30% |
| Sweetener (sucrose)* | 30-50% |
| Flavors | 1-5% |
| Nutritional additives | 1-2% |

(*Expressed in weight of solids)

The water activity of the coffee-based liquid premix is less than about 0.85; pH is about 6-7 and total solids is about 67% to 75%.

The coffee-based liquid premix is heat treated under the following conditions: about 85-93° C. for about 30-90 seconds (non-UHT conditions) and packaged in a multilayer plastic pouch with a foil layer. The premix is stable during about 12 months at ambient conditions. The water activity should be low, i.e., less than about 0.85, with stabilizers to substantially prevent degradation of aroma, flavors, and physical stability. The packaging preferably protects the product from light and oxygen.

A cocoa-based liquid premix is made of the following:

| Cocoa solids | 5-10% |
|---|---|
| Non-dairy creamer | 15-30% |
| Sweetener (sucrose) | 30-50% |
| Flavors | 1-5% |
| Nutritional additives | 1-2% |

Preferably, the stabilizers are incorporated into the creamers. One tea-based liquid premix is made of the following:

| Tea solids | 5-10% |
|---|---|
| Non-dairy Creamer | 15-30% |
| Sweetener (sucrose) | 30-50% |
| Flavors | 1-5% |
| Nutritional additives | 1-2% |

All products in these examples are reconstituted in water (hot or cold) at a ratio of about 1 volume premix to 7 volumes water. Also, additive concentrate will be dosed at 0.3 to 0.5 milliliters into the reconstituted beverages described above. Operational delivery conditions include a clean environment, away from direct sunlight, and at temperatures between about 20 and 35° C.

The invention claimed is:

1. A method for delivering a non-carbonated beverage comprising:
   providing at least one packaged source of a liquid premix base comprising at least one degradable beverage component that comprises at least a non-carbohydrate subcomponent, wherein the packaged liquid premix base has a water activity of less than 0.855 and is shelf stable at room temperature;
   providing separately a plurality of packaged additive sources comprising at least one component selected from the group consisting of flowable favor, aroma, and nutritional additives;
   dosing the liquid premix base;
   mixing the dosed premix base with non-carbonated water to provide a beverage base, the beverage base being dispensed into a container using a beverage base delivery line;
   dosing at least one of a plurality of additives;
   selecting the at least one of the plurality of additives and delivering the at least one additive separately from the beverage base to the container without making contact with the beverage base or the beverage base delivery line; and
   dispensing into the container the at least one additive and the beverage base such that the additive and beverage base are mixed in the container during delivery and a concentration of the at least one additive in the beverage base is varied during the dispensing.

2. The method of claim 1, wherein the beverage component has a characteristic selected from the group consisting of microbiologically, physically, enzymatically and chemically degradable.

3. The method of claim 1, wherein:
   the premix base has a total solid content of at least 65% by weight; and
   a pH of from 3.9 to 6.8.

4. The method of claim 3, wherein the liquid premix base is formulated, heat treated and stored in a sealed package to be shelf stable at room temperature for at least 2 months before the package is opened.

5. The method of claim 1, wherein the premix base is diluted with water to form the beverage base at a ratio of premix base-to-water of about from 1:2 to 1:8 by volume.

6. The method of claim 1, wherein the flowable additive is mixed in the beverage base in a relative ratio of additive to beverage of about between 1:1000 to 1:25.

7. The method of claim 1, wherein the additive comprises flavor and propylene glycol.

8. The method of claim 1, wherein the liquid premix base comprises a plurality of liquid premix bases, the method comprising selecting at least one of the premix bases and at least one of the additives, and mixing the beverage base having the selected premix bases with the selected additives.

9. The method of claim 8, wherein at least two of the liquid premix bases are selected and dispensed in the beverage base.

10. The method of claim 9, wherein the packaged source comprises:
   a first packaged source of a first liquid premix base that comprises a coffee concentrate, a whitener and a water-activity lowering component;
   a second packaged source of a second liquid premix base that comprises a cocoa concentrate, a whitener and at least one water-activity lowering component that renders the liquid base shelf stable; and
   the method further comprises selecting at least one of the first and second liquid premix bases, and mixing the selected bases with the water and dispensing in the container.

11. The method of claim 10, wherein the whitener is a dairy based component.

12. The method of claim 9, wherein the whitener is a non-dairy creamer.

13. The method of claim 1, wherein the liquid base is mixed with water at a temperature of less than 30° C.

14. The method of claim 1, wherein the liquid premix base comprises:
   a first beverage component selected from the group consisting of coffee concentrate, tea concentrate, cocoa concentrate, chicories concentrate, and combinations thereof;
   a whitener; and
   at least one water-activity lowering component so that the liquid premix base is shelf-stable at room temperature.

15. The method of claim 1, wherein the flowable additive is selected from the group consisting of a flavoring, flavor enhancer, nutritional supplement, coffee or tea booster, flavor masker, colorant, aromatic, a substance selected for adding body to beverage base, and combinations of same.

16. The method of claim 1, comprising foaming the beverage base.

* * * * *